March 1, 1927.  E. WISROTH ET AL  1,619,555
AUTOMOBILE PARKING DEVICE
Filed July 21, 1926   3 Sheets-Sheet 1
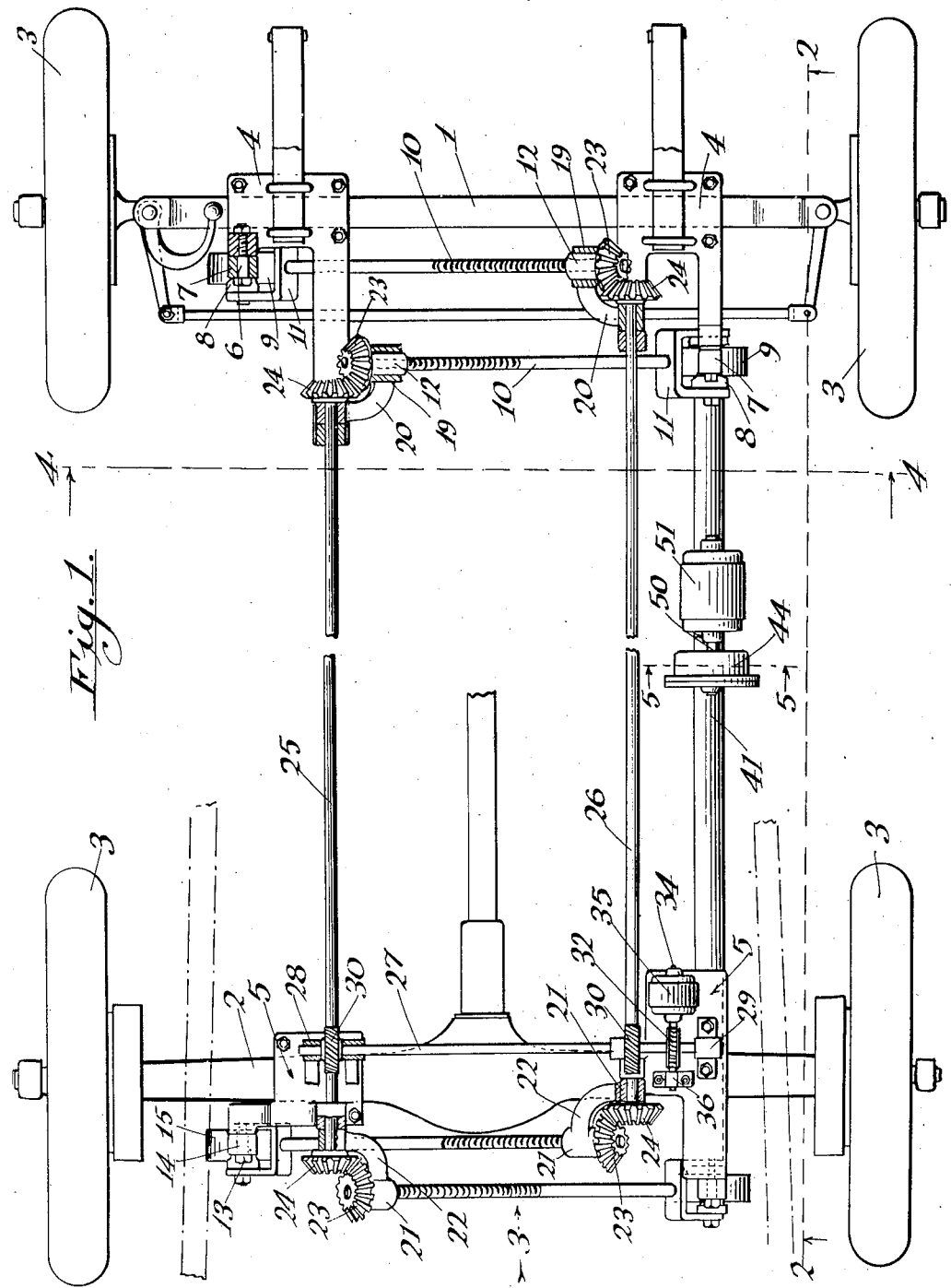
Inventors
Ernst Wisroth
Armond J. Hirschfield
by Hazard and Miller
Attorneys March 1, 1927. 1,619,555
E. WISROTH ET AL
AUTOMOBILE PARKING DEVICE
Filed July 21, 1926 3 Sheets-Sheet 2
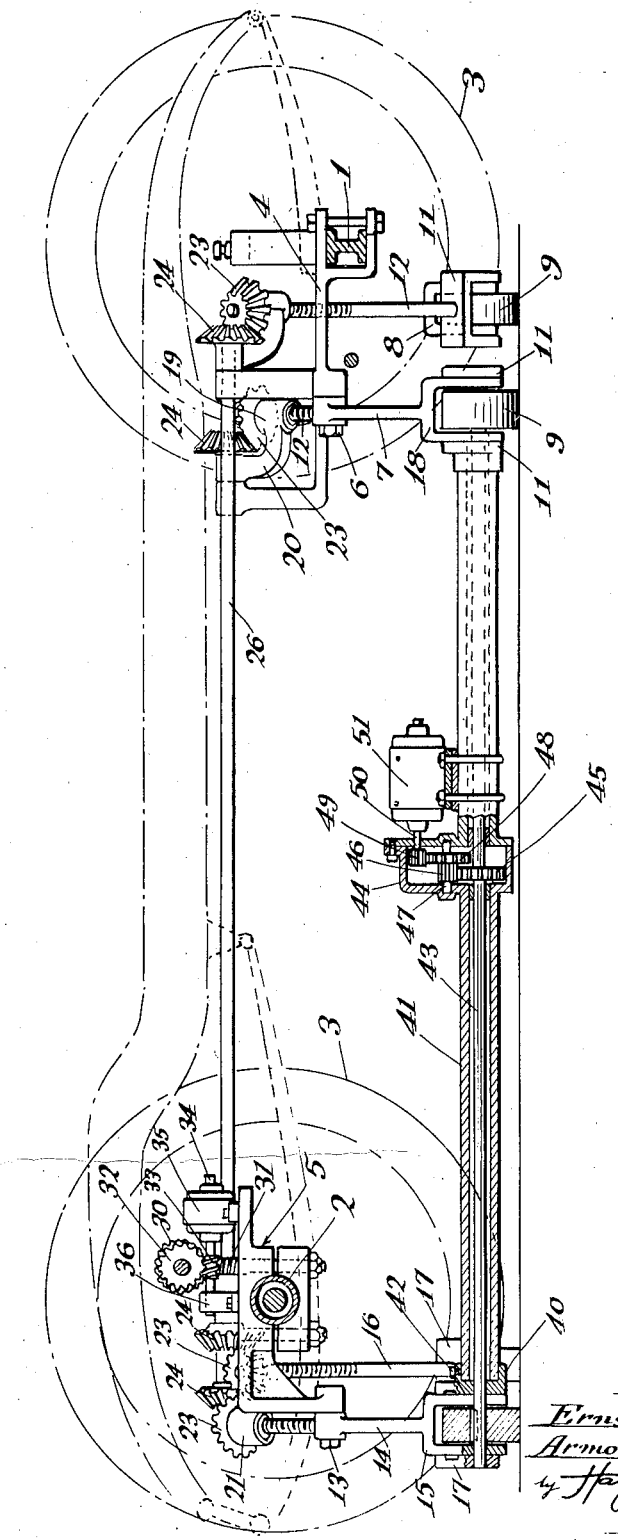
Inventors
Ernst Wisroth
Armond J. Hirschfield
by Hazard and Miller
Attorneys March 1, 1927.
E. WISROTH ET AL
AUTOMOBILE PARKING DEVICE
Filed July 21, 1926   3 Sheets-Sheet 3
1,619,555
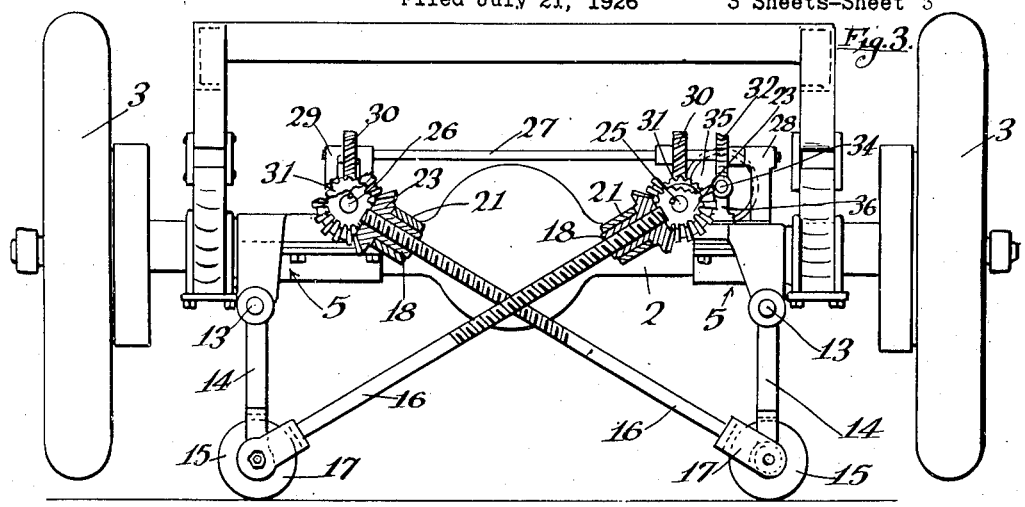
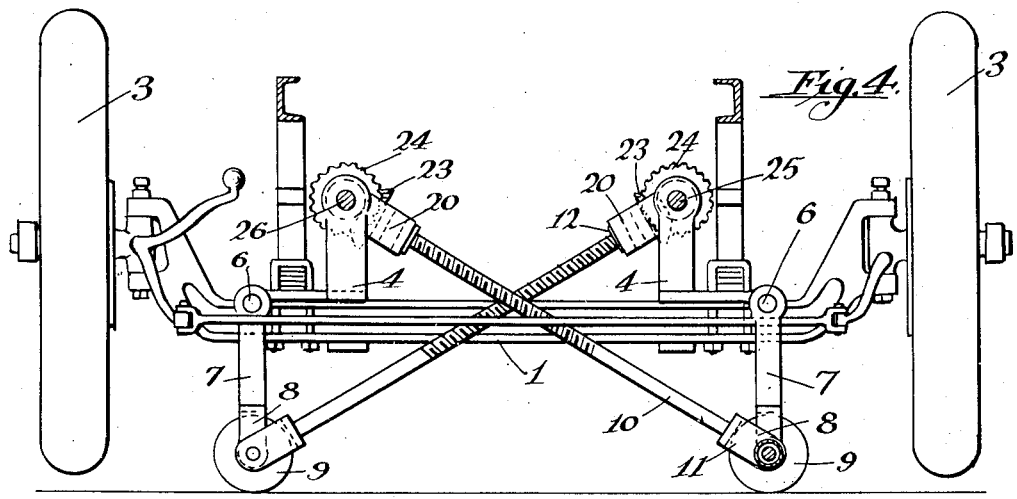
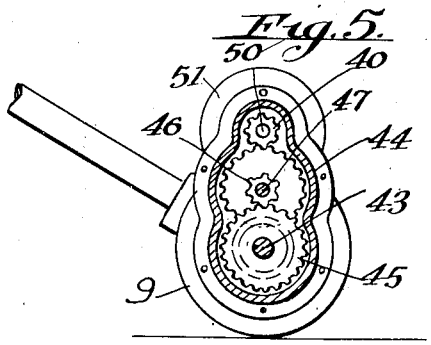
Inventors
Ernst Wisroth
Armond J. Hirschfield
by Hazard and Miller
Attorneys

Patented Mar. 1, 1927.

1,619,555

UNITED STATES PATENT OFFICE.

ERNST WISROTH AND ARMOND J. HIRSCHFIELD, OF LOS ANGELES, CALIFORNIA.

AUTOMOBILE PARKING DEVICE.

Application filed July 21, 1926. Serial No. 123,939.

Our invention is an automobile parking device intended to raise the vehicle wheels of the ordinary running wheels off the ground and to support the vehicle on small transverse wheels, these transverse wheels being driven so that the automobile may be bodily moved laterally to park same adjacent a curb or other more or less inaccessible place.

An object of our invention is a parking device carried by an automobile and operated thereby, so that the regular running wheels can be elevated and small transverse conveying wheels may be substituted. These wheels are elevated and depressed by a jack type of device elevating both the front and the back wheels. One or more of these wheels may be driven so as to bodily move the automobile in a sidewise direction, thereby allowing parking same close to a curb and parking a number of vehicles similarly equipped, close together.

A more particular object of our invention is providing pairs of pivotally mounted smalls wheels connected to the front and back axles of an automobile and operating these wheels by a screw-jack type of device to elevate same and depress same into engagement with the ground, thereby elevating the ordinary running wheels of the vehicle.

Another object of our invention is to interconnect a pair of these wheels on the front and back axle to positively rotate same, thereby moving the vehicle sidewise the desired distance.

Our invention will be more readily understood from the following description and drawings, in which;

Figure 1 is a plan view of our parking device, illustrating only sufficient details of the automobile to show the attachment thereof;

Fig. 2 is a vertical longitudinal section on the line 2—2 of Fig. 1, in the direction of the arrows;

Fig. 3 is a rear elevation in the direction of the arrow 3 of Fig. 1, with parts broken away;

Fig. 4 is a transverse section on the line 4—4 of Fig. 1, in the direction of the arrows;

Fig. 5 is a detail section on the line 5—5 of Fig. 1, in the direction of the arrows, showing the driving train for operating the small wheels.

The jacking mechanism of our parking device is constructed substantially as follows, having reference particularly to Figs. 1 to 4.

The front axle of an automobile is designated by the numeral 1, the rear axle housing by the numeral 2 and the ordinary running wheels by the numeral 3. A strong supporting bracket 4 is clamped to the front axle and extends rearwardly and a bracket 5 is attached to the rear axle housing, extending both forwardly and rearwardly therefrom.

In the front axle housing shown particularly in Fig. 4, longitudinal pivots 6 form a connection for the wheel legs 7 and the brackets, these wheel legs having yokes 8 at the base in which are mounted small wheels 9. Jack rods 10 are connected through suitable yokes 11 with the wheels. These rods lead upwardly and cross each other and are threaded through nuts 12. The rear axle mounting is substantially the same, being shown in Fig. 3, there being pivots 13 for the legs 14 and to which the wheels 15 are connected.

The rear jack rods 16 are connected through yokes 17 to the wheels and threaded through the rear nuts 18. The nuts 12 are supported in a sleeve 19 which is attached rigidly to a curved frame arm 20 and the rear nuts 18 are supported in a similar sleeve 21 rigidly connected to the bent arms 22. These arms are rigidly connected to the front and rear brackets 4 and 5 respectively.

Each of the nuts 12 and 18 is provided with a bevel gear 23 which mesh with bevel gears 24 on longitudinal shafts 25 and 26 extending lengthwise of the vehicle on opposite sides thereof.

The driving arrangement for the jacks is substantially as follows, having reference particularly to Figs. 1, 2 and 3:

A transverse shaft 27 journaled in supports 28 and 29 has a pair of helical gears 30 which mesh with helical gears 31 on the longitudinal shafts 25 and 26. This shaft 27 is continued at one end and has a worm gear 32 meshing with a worm 33, the latter being mounted on the motor shaft 34 or a continuation of said shaft; the motor 35 being supported on part of the bracket 5 of the rear axle housing. Such worm shaft has a bearing in the journal 36.

It will be understood that there are suitable electric circuits with control switches and the like from the motor to a control station convenient to the driver of the automobile. When it is desired to park the vehicle by raising and lowering the small wheels, the action is substantially as follows:

It will be understood that normally the jack rods 16 are screwed upwardly substantially to the limit, holding the small wheels 15 at as high an elevation as possible above the ground or at least as high as the lowest part of the engine or body frame or of the rear axle housing. When the motor is operated in the proper direction by the medium of theh worm 33 and the worm gear 32, the transverse shaft 27 is rotated, thence the longitudinal shafts 25 and 26 are rotated through the medium of the helical gears 30 and 31. The bevel gears 24 on each end of both of the shafts 25 and 26 then operate the bevel gears 23 formed integral with the nuts 12 and 18, thereby actuating the jack rods 10 and 16 depressing the small wheels 9 and 15 for the front and rear axle respectively. This action lifts the driving wheels of the vehicle above the ground as illustrated in Figs. 3 and 4.

The mechanism for providing lateral motion is substantially as follows, having reference particularly to Figs. 1, 2 and 5:

As shown in Fig. 2, the yokes 11 and 17 are provided with a socket 40 in which is secured a frame 41 which may be tubular or formed of suitable rigid bars, this frame being clamped by set screws 42 or the like. A long shaft 43 forming the driving axle for one pair of the small wheels 9 and 15 is centered within this frame. A gear box 44 contains a train of gears; this comprising a driven gear 45 on the shaft 43, an idler pinion 46 on an idler shaft 47, a large gear 48 on the same shaft, this latter meshing with a pinion 49 on the motor shaft 50 of the motor 51; this latter being suitably clamped or attached to the frame 41. It will be understood that there is suitable electric wiring from the motor to a control device adjacent the operator's compartment of the automobile.

When it is desired to move the vehicle transversely after being elevated as above described, it is merely necessary to actuate the motor to drive same in the proper direction, whence by the gear reduction system above mentioned the electric motor 51, through the medium of its shaft 50 operates the gears in the gear box 44 and thereby rotates the shaft 43 which latter being keyed or otherwise secured to the small wheels 9 and 15 rotates same and forms the driving medium to contact with the ground for transporting the vehicle sidewise to the desired parking position.

It will be understood that this transverse motion may be stopped at any time by stopping the motor and on account of the gear reduction system a sufficient brake is thus provided so that this sideways motion may be stopped at any desired position. When the vehicle is suitably parked is may be left elevated as above described or lowered on to its driving wheels if desired.

From the above description it will be seen that we have designed a relatively simple parking device which may be attached to the front and back axles of an automobile and readily operated to raise and lower same and to move the automobile bodily sideways. It will be manifest that our design in its general construction and in specific details may be considerably modified to adapt same to different types of automobiles and if desired the various parts may be incorporated in the automobile structure. Such changes, however, would be within the spirit of our invention as set forth in the description, drawings and claims.

As above mentioned our parking device allows sidewise movement of an automobile in either direction, this being necessary to park against a curb and to move the vehicle away from the curb, and also forms a useful feature in a garage for placing a car where desired.

It is also obvious that our jacking arrangement independent of the lateral movement, is of manifest utility in jacking a car for repair work or the like and that also on hills an automobile may be jacked up off its driving wheels on to the transverse wheels, thereby preventing the car from rolling down hill.

Having described our invention, what we claim is:

1. An automobile parking device comprising in combination a vehicle having front and rear axles, brackets connected to said axles, legs pivotally connected to the brackets, transverse wheels at the base of said legs, jack rods connected to said wheels, said rods crossing each other, and means mounted in a fixed position on opposite sides of the vehicle to actuate the jack rods to elevate and lower the transverse wheels.

2. An automobile parking device as claimed in claim 1, having an electric motor, a frame operatively connected with one or more of the transverse wheels to raise and lower said motor, and a drive connection from said motor to one or more of the transverse wheels to move the vehicle sideways.

3. An automobile parking device comprising in combination a vehicle having front and rear axles, transverse wheels operatively connected to said axles to raise and lower, jack screws operatively connected to said wheels and crossing each other, longitudinal shafts extending between the front and rear axles on opposite sides of the vehicle, means to drive said shafts in unison, and gear connections between the longitudinal shafts and the jack shafts to operate same simultaneously for raising and lowering the transverse wheels.

4. An automobile parking device as claimed in claim 3, in which the means to operate the longitudinal shafts comprises a transverse shaft, gearing interconnecting the transverse and longitudinal shafts, and an electric motor to actuate the transverse shaft.

5. An automobile parking device as claimed in claim 3, a framing connecting a pair of transverse wheels on one side of the vehicle, an axle shaft extending through said framing, said wheels being keyed to said axle shaft, an electric motor mounted on the framing and a system of gear between the motor and the said axle shaft.

6. An automobile parking device for a vehicle, having front and rear axles, the combination of brackets attached to said axles, legs pivotally connected to said brackets, transverse wheels at the foot of said legs, jack screws operatively connected to said wheels, said jack screws crossing each other and having nuts with bevel gears threaded on their upper ends, means operatively connected to said brackets, forming a mounting for said nuts, longitudinal shafts between said brackets, said shafts having bevel gears meshing with the gears of the nuts, and means to operate said longitudinal shafts in unison.

7. An automobile parking device as claimed in claim 6, the jack rods being connected to the transverse wheels by yokes, a frame connecting the said yokes over a pair of transverse wheels on one side of the vehicle, an axle shaft keyed to said wheels, extending through the frame, a motor mounted on the frame, and a train of reduction gears between the motor and the axle shaft.

8. An automobile parking device comprising in combination a vehicle having front and rear axles, brackets connected to said axles, legs pivotally connected to the brackets, transverse wheels at the base of the legs, jack rods connected to said wheels, said rods crossing each other, a drive mechanism mounted in a fixed position on opposite sides of the vehicle to actuate the jack rods, and an electric motor having means mounting same on one of the axles and connected to the said drive mechanism.

9. An automobile parking device comprising in combination a vehicle frame having front and rear axles, brackets connected to the axles, legs pivotally connected to the brackets, transverse wheels at the base of the legs, jack rods connected to the wheels, an electric motor mounted on a structure connected to one of the axles, and means to actuate the rods from the said motor.

10. An automobile parking device comprising in combination a vehicle having front and rear axles, brackets connected to the axles, legs pivotally connected to the brackets, transverse wheels at the base of the legs, a frame operatively connected to one or more of the transverse wheels, a motor on said frame, and a drive connection from said motor to one or more of the transverse wheels to move the vehicle sideways.

11. An automobile parking device comprising in combination a vehicle having a frame, supporting means connected to the frame, legs pivotally connected to said supporting means, transverse wheels at the base of the legs, jack rods connected to said wheels, an electric motor, and means to actuate said jack rods by the motor.

12. An automobile parking device, as claimed in claim 11, a frame operatively connected with one or more transverse wheels, a motor mounted thereon, and a geared drive connection from the motor to actuate said wheels to move the vehicle sideways.

In testimony whereof we have signed our names to this specification.

ERNST WISROTH.
ARMOND J. HIRSCHFIELD.